United States Patent
Eddy et al.

(10) Patent No.: US 7,996,650 B2
(45) Date of Patent: Aug. 9, 2011

(54) MICROPROCESSOR THAT PERFORMS SPECULATIVE TABLEWALKS

(75) Inventors: Colin Eddy, Round Rock, TX (US); Rodney E. Hooker, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 546 days.

(21) Appl. No.: 12/172,729

(22) Filed: Jul. 14, 2008

(65) Prior Publication Data
US 2010/0011188 A1 Jan. 14, 2010

(51) Int. Cl.
*G06F 12/10* (2006.01)
(52) U.S. Cl. .......................... 711/207; 711/205
(58) Field of Classification Search .................. None
See application file for complete search history.

(56) References Cited

U.S. PATENT DOCUMENTS
5,564,111 A * 10/1996 Glew et al. ................ 714/53
5,613,083 A * 3/1997 Glew et al. ................ 711/207

FOREIGN PATENT DOCUMENTS
CN          1604055 A      4/2005

OTHER PUBLICATIONS

Hu et al. "Out-of-Order Execution in Sequentially Consistent Shared Memory Systems: Principles." Chinese J. Computers. vol. 20, No. 6. Jun. 1997. pp. 481-490.
"TLBs, Paging-Structure Caches, and Their Invalidation." Application Note. Intel 317080-002 pp. 1-34.

* cited by examiner

*Primary Examiner* — Than Nguyen
(74) *Attorney, Agent, or Firm* — E. Alan Davis; James W. Huffman

(57) ABSTRACT

A microprocessor performs a speculative page tablewalk. The microprocessor includes a tablewalk engine that determines whether at least one of a predetermined set of conditions exists with respect to characteristics of the page of memory whose physical address specified by a memory access instruction is missing in the TLB, performs operations of the tablewalk in an out-of-order manner with respect to the execution of unretired program instructions older than the memory access instruction while none of the predetermined set of conditions exists, and waits to perform the operations of the tablewalk until the microprocessor has retired all program instructions older than the memory access instruction when at least one of the predetermined set of conditions exists. The predetermined set of conditions may include the tablewalk needing to load information from a strongly-ordered page, update page mapping information, or access a global page.

23 Claims, 3 Drawing Sheets

MICROPROCESSOR THAT PERFORMS SPECULATIVE TABLEWALKS

FIELD OF THE INVENTION

The present invention relates in general to the field of microprocessors that support paged virtual memory, and more specifically to microprocessors that perform page table walks in response to a TLB miss.

BACKGROUND OF THE INVENTION

Many modern microprocessors support the notion of virtual memory. In a virtual memory system, instructions of a program executing on the microprocessor refer to data using virtual addresses in a virtual address space of the microprocessor. The microprocessor translates virtual addresses into physical addresses that it uses to access physical memory.

A common virtual memory scheme supported by microprocessors is a paged memory system. A paged memory system employs a paging mechanism for translating, or mapping, virtual addresses to physical addresses. The physical address space is divided up into physical pages of fixed size. A common page size is 4 KB. The virtual addresses comprise a virtual page address portion and a page offset portion. The virtual page address specifies a virtual page in the virtual address space. The paging mechanism of the microprocessor translates the virtual page address into a physical page address. This process is known as page translation. The page offset specifies a physical offset in the physical page, i.e., a physical offset from the physical page address.

The operating system decides which physical pages in memory will be mapped to each virtual page and maintains page mapping information that specifies the mappings. When the microprocessor encounters an instruction that specifies a virtual address to access a location in memory, such as a load or store instruction, the microprocessor must translate the virtual address to the proper physical address by using the operating system's page mapping information. The operating system maintains the page mapping information in system memory. Thus, the microprocessor must read the appropriate page mapping information from memory to translate the virtual address into the physical address. The page mapping information is typically hierarchically arranged in order to reduce its size, which requires the microprocessor to traverse the hierarchy by performing read operations at multiple levels of the hierarchy. For this reason, and because at least a portion of the page mapping information is commonly referred to as page tables, the process of the microprocessor traversing the page mapping information to translate a virtual address to a physical address is commonly referred to as a page table walk, or simply tablewalk.

As an example, a popular hierarchical page mapping information scheme includes a first level page directory and second level page tables. Each entry in the page directory points to a different page table, and each entry in each page table includes the physical address and characteristics of the page mapped to that entry. The base address of the page directory is stored in a register of the microprocessor. Such a scheme is illustrated in FIG. 3-12 on page 3-23 of the IA-32 Intel Architecture Software Developer's Manual, Volume 3A: System Programming Guide, Part 1, document number 253668-020US, published June 2006 by the Intel Corporation, which is incorporated by reference herein for all purposes. In this example, the microprocessor performs a tablewalk by reading the page directory entry at the index within the page directory specified by page directory entry bits in the upper portion of the virtual address. The page directory entry specifies the base address of the relevant page table. The microprocessor then reads the page table entry at the index within the page table specified by page table bits in the middle portion of the virtual address. The page table entry specifies the physical address of the relevant page. The page table entry also includes characteristics for each page. For example, the page characteristics may include an indication of whether the page has been accessed; whether the page has been written; caching characteristics, such as whether the page is cacheable and, if so, the write-back caching policy; which privilege level is assigned to the page; the write privileges of the page; and whether the page is present in physical memory. The operating system populates the page directory entries and page table entries with the page characteristic values. However, the microprocessor must update some of the page characteristics in response to program execution. For example, in the Intel scheme mention above, the processor writes the relevant page directory entry and/or page table entry to update the Accessed and/or Dirty bits in response to the program reading and/or writing memory pages. Thus, when performing a tablewalk, in addition to reading the page mapping information from system memory to translate a virtual address to a physical address, the processor may sometimes also have to write the page mapping information in system memory.

Because the page mapping information resides in system memory, and accesses to system memory are relatively slow, it is a relatively costly operation for the microprocessor to perform a tablewalk to perform a virtual to physical address translation and to obtain and/or update the page characteristics. To improve performance by reducing the number of tablewalks, many microprocessors provide a mechanism for caching the page mapping information. The page mapping information cache is commonly referred to as a translation lookaside buffer (TLB). When the microprocessor encounters a memory access instruction, the microprocessor provides the virtual address to the TLB and the TLB performs a lookup of the virtual page address. If the virtual page address hits in the TLB, then the TLB provides the corresponding translated physical page address and page characteristics, thereby avoiding the need to perform a tablewalk. However, if the virtual page address misses in the TLB, then the microprocessor must perform a tablewalk. Thus, in addition to reading the page mapping information from memory and updating the page mapping information as necessary, the tablewalk also includes the microprocessor allocating an entry in the TLB and updating it with the translated physical address and page characteristics.

To summarize, broadly speaking, a tablewalk comprises three steps. The first step is to read the necessary page mapping information from memory required to translate the virtual address to a physical address and to obtain the page characteristics. The second step is to update the page mapping information in system memory, if necessary. The third step is to allocate a TLB entry and update it with the new page mapping information.

Many modern microprocessors are superscalar. That is, the microprocessor includes multiple execution units and is capable of issuing multiple instructions to the execution units in a single clock cycle. Many modern microprocessors also perform out-of-order execution. That is, the microprocessor may execute instructions out of the order specified by the program that includes the instructions. Superscalar out-of-order execution microprocessors typically attempt to maintain a relatively large pool of outstanding instructions so that they can take advantage of a larger amount of instruction parallelism.

Many modern microprocessors also perform speculative execution of instructions. That is, the microprocessor executes instructions, or at least performs some of the actions prescribed by the instruction, before knowing certainly whether the instruction will actually complete. There are reasons why an instruction may not complete. For example, the microprocessor may have mispredicted a branch instruction that is older than the instruction in question. For another example, the microprocessor may take an exception before the instruction in question completes. The exception may be asynchronous, such as an interrupt, or it may be synchronous, i.e., caused by an instruction, such as a page fault, divide by zero condition, general protection error, and so forth. The exception-causing instruction may be the instruction in question or an instruction older than the instruction in question. Although the microprocessor may perform some of the actions prescribed by the instruction speculatively, the microprocessor is not allowed by the architecture to update the architectural state of the system with the results of an instruction until the instruction is no longer speculative, i.e., until it is certain that the instruction will complete.

When a conventional out-of-order execution microprocessor suffers a TLB miss that necessitates a tablewalk, the microprocessor serializes the tablewalk with the other outstanding program instructions. That is, the conventional microprocessor waits until all program instructions older than the initiator instruction (the instruction that caused the TLB miss) have retired before it performs the tablewalk and does not issue to the execution units for execution any program instructions newer than the initiator instruction until it completes the tablewalk. Because the conventional microprocessor serializes tablewalks, and because the number of instructions older than the initiator instruction may be large and/or some of the instructions may be long latency instructions such as memory access instructions or floating point instructions, the conventional microprocessor may wait a relatively long time to perform the tablewalk and the conventional microprocessor may be forfeiting the opportunity of executing instructions newer than the initiator instruction. This may significantly adversely affect the performance of the conventional microprocessor.

SUMMARY OF THE INVENTION

The present invention provides microprocessor that performs speculative page tablewalks when conditions permit.

In one aspect, the present invention provides a microprocessor configured to perform a speculative tablewalk. The microprocessor includes a translation lookaside buffer (TLB) that indicates that a physical page address of a page of memory that a memory access instruction is attempting to access is missing in the TLB. The microprocessor includes a tablewalk engine that determines whether at least one of a predetermined set of conditions exists with respect to characteristics of the page of memory, performs operations of the tablewalk in an out-of-order manner with respect to the execution of unretired program instructions older than the memory access instruction while none of the predetermined set of conditions exists, and waits to perform the operations of the tablewalk until the microprocessor has retired all program instructions older than the memory access instruction when at least one of the predetermined set of conditions exists. To determine whether at least one of the predetermined set of conditions exists, the tablewalk engine is configured to at least determine whether the memory page whose physical page address is missing in the TLB is a global page. To determine whether the memory page whose physical page address is missing in the TLB is a global page, the tablewalk engine is configured to at least determine whether the memory page whose physical page address is missing in the TLB is of a type for which the microprocessor will not invalidate an entry in the TLB for the memory page when the microprocessor performs a task switch.

In another aspect, the present invention provides a method for a microprocessor having a translation lookaside buffer (TLB) to speculatively perform a tablewalk in response to the microprocessor executing a memory access instruction that accesses a page of memory whose physical page address is missing in the TLB. The method includes determining whether at least one of a predetermined set of conditions exists with respect to characteristics of the page of memory. The method also includes performing operations of the tablewalk in an out-of-order manner with respect to the execution of unretired program instructions older than the memory access instruction, while none of the predetermined set of conditions exists. The method also includes waiting to perform the operations of the tablewalk until the microprocessor has retired all program instructions older than the memory access instruction, when at least one of the predetermined set of conditions exists. Determining whether at least one of a predetermined set of conditions exists comprises determining whether the memory page whose physical page address is missing in the TLB is a global page. Determining whether the memory page whose physical page address is missing in the TLB is a global page comprises determining whether the memory page whose physical page address is missing in the TLB is of a type for which the microprocessor will not invalidate an entry in the TLB for the memory page when the microprocessor performs a task switch.

In another aspect, the present invention provides a computer program product for use with a computing device, the computer program product including a computer usable storage medium having computer readable program code embodied in the medium, for specifying a microprocessor configured to perform a speculative tablewalk. The computer readable program code includes first program code for specifying a translation lookaside buffer (TLB) that indicates that a physical page address of a page of memory that a memory access instruction is attempting to access is missing in the TLB. The computer readable program code includes second program code for specifying a tablewalk engine. The tablewalk engines determines whether at least one of a predetermined set of conditions exists with respect to characteristics of the page of memory, performs operations of the tablewalk in an out-of-order manner with respect to the execution of unretired program instructions older than the memory access instruction while none of the predetermined set of conditions exists, and waits to perform the operations of the tablewalk until the microprocessor has retired all program instructions older than the memory access instruction when at least one of the predetermined set of conditions exists. To determine whether at least one of the predetermined set of conditions exists, the tablewalk engine is configured to at least determine whether the memory page whose physical page address is missing in the TLB is a global page. To determine whether the memory page whose physical page address is missing in the TLB is a global page, the tablewalk engine is configured to at least determine whether the memory page whose physical page address is missing in the TLB is of a type for which the microprocessor will not invalidate an entry in the TLB for the memory page when the microprocessor performs a task switch.

The predetermined set of conditions may include the tablewalk needing to load information from a strongly-ordered page, update page mapping information, or access a global page.

DETAILED DESCRIPTION OF THE INVENTION

The present inventors have recognized that a microprocessor need not necessarily serialize tablewalks in many situations and provide a scheme for a microprocessor to speculatively perform tablewalks rather than serializing them if the proper conditions are met. In particular, the microprocessor normally performs a tablewalk speculatively, and only serializes the tablewalk when: 1) a system memory access associated with the tablewalk is required to be strongly ordered on the processor bus; 2) the processor needs to write to system memory to update the page mapping information in order to perform the tablewalk; or 3) the system memory page for which the tablewalk will update the TLB is a global page.

Figure 1:
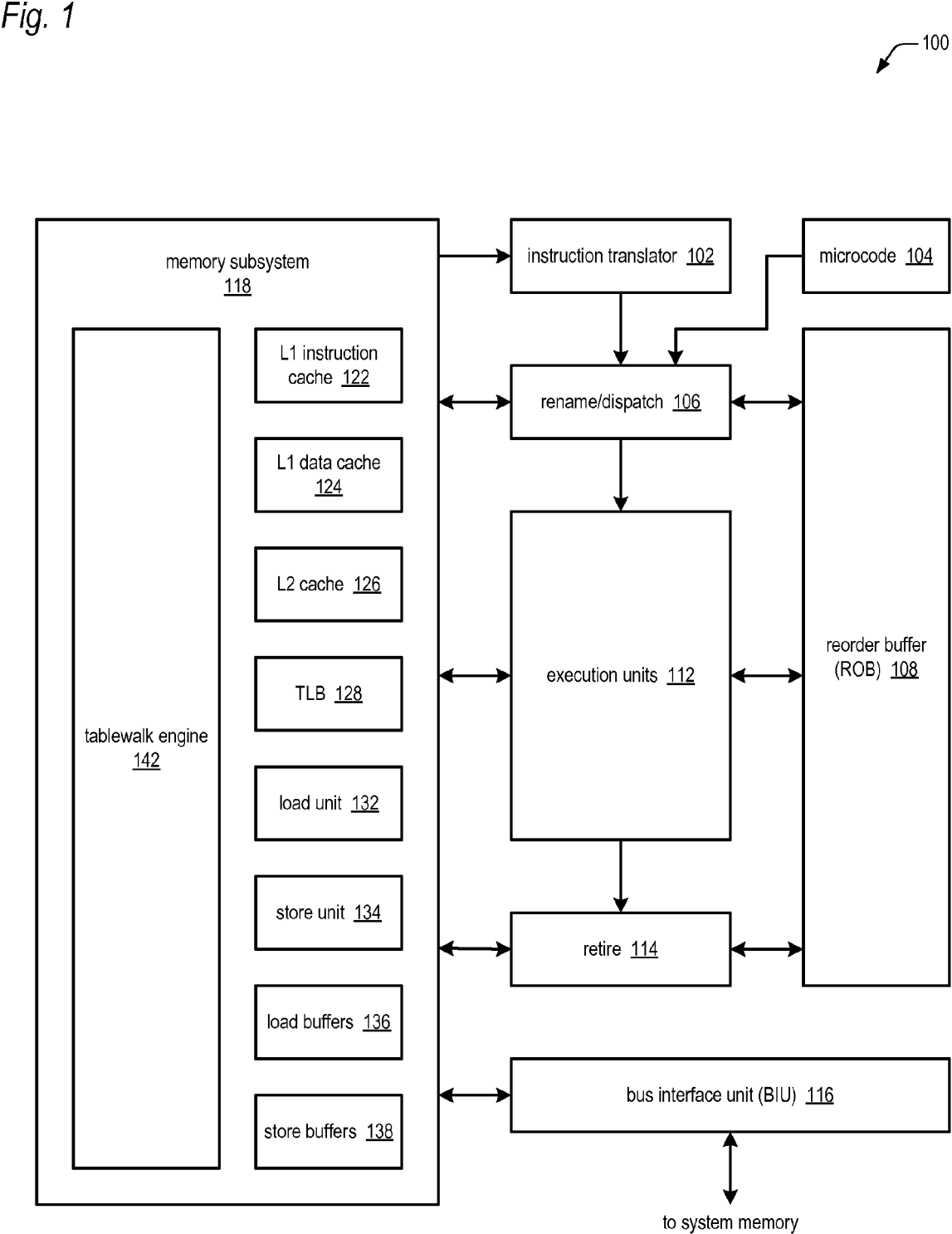
FIG. 1 is a block diagram illustrating a microprocessor according to the present invention.

Referring now to FIG. 1, a block diagram illustrating a microprocessor 100 according to the present invention is shown. The microprocessor 100 includes an instruction translator 102, microcode 104, a rename/dispatch unit 106, a reorder buffer (ROB) 108, execution units 112, a retire unit 114, a bus interface unit (BIU) 116, and a memory subsystem 118. The memory subsystem 118 includes a level-1 instruction cache 122, a level-1 data cache 124, a level-2 cache 126, a translation lookaside buffer (TLB) 128, a load unit 132, a store unit 134, load buffers 136, store buffers 138, and a tablewalk engine 142. In one embodiment, the load unit 132 and store unit 134 are included in the execution units 112. The BIU 116 interfaces the microprocessor 100 to a processor bus to which system memory and other devices, such as a system chipset, are coupled. The operating system running on the microprocessor 100 stores page mapping information in the system memory, which the microprocessor 100 reads and writes to perform tablewalks, as described herein.

The instruction translator 102 receives macroinstructions from the memory subsystem 118, such as the L1 instruction cache 122, and translates the macroinstructions into microinstructions which it provides to the rename/dispatch unit 106. For certain macroinstructions, the instruction translator 102 transfers control to the microcode 104, which provides microinstructions to the rename/dispatch unit 106. Some of the microinstructions are load or store instructions that access memory. That is, the load/store instructions specify virtual addresses to access memory or other devices in the memory space of the microprocessor 100 that the BIU 116 must access on the processor bus using physical memory addresses. The TLB 128 caches virtual to physical page address translations and page characteristics of recently accessed memory pages to reduce the amount of time required by the microprocessor 100 to execute a load/store instruction.

The rename/dispatch unit 106 allocates entries in the ROB 108 for each microinstruction that is outstanding in the microprocessor 100. The microinstructions are allocated into the ROB 108 in program order and retired from the ROB 108 in program order by the retire unit 114, even though the execution units 112 may execute the microinstructions dispatched to them out of program order. The store unit 134 executes store instructions by writing data to the store buffers 138, which subsequently write the data to memory, such as system memory, the L2 cache 126, and/or the L1 data cache 124. The load unit 132 executes load instructions by reading data into the load buffers 136 from the system memory, the L2 cache 126, and/or the L1 data cache 124.

Figure 3:
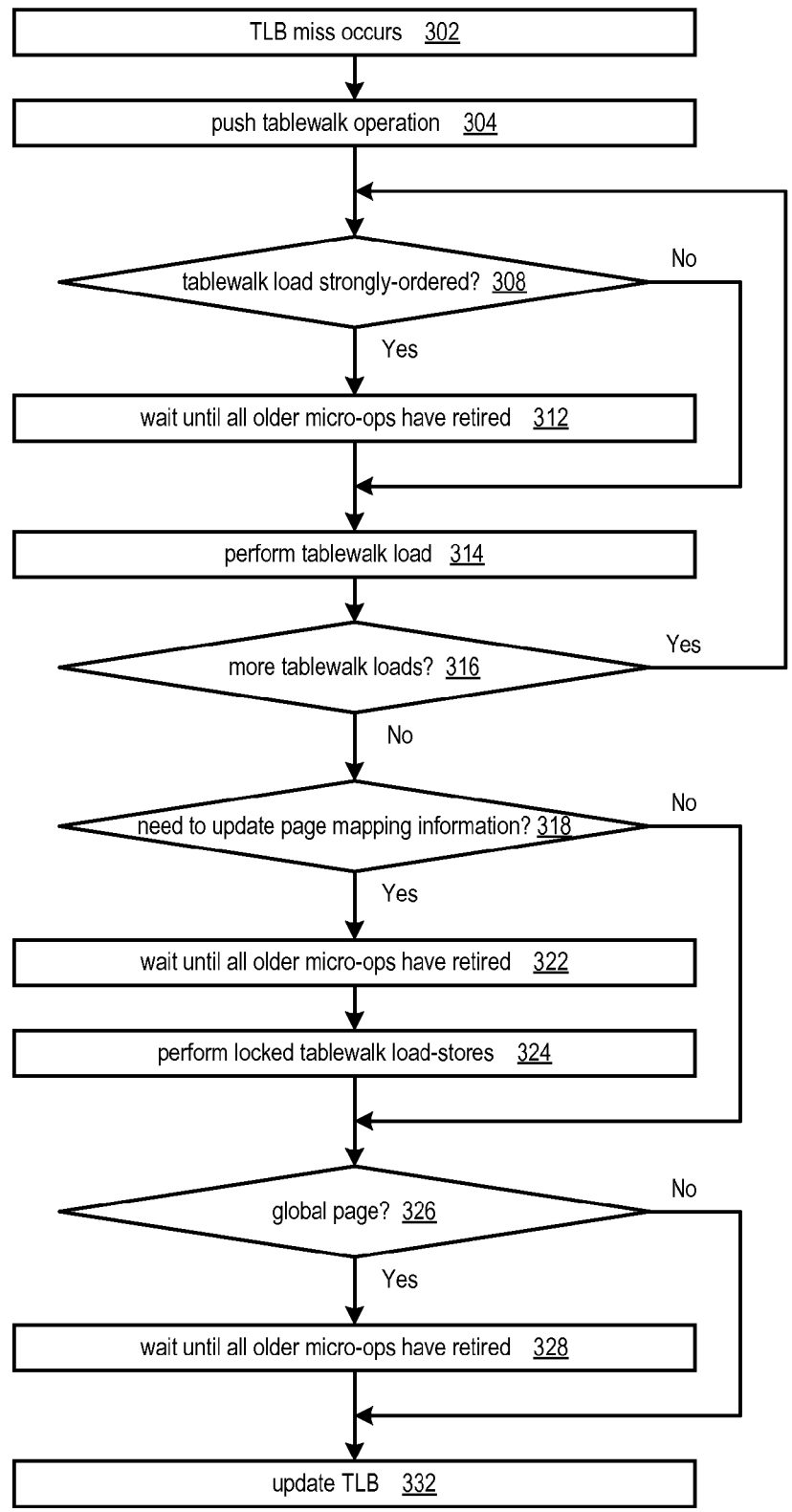
FIG. 3 is a flowchart illustrating operation of the microprocessor of FIG. 1 to perform a tablewalk according to the present invention.

When a load/store instruction misses in the TLB 128, the tablewalk engine 142 responsively performs a speculative tablewalk as described in detail with respect to FIG. 3.

Figure 2:
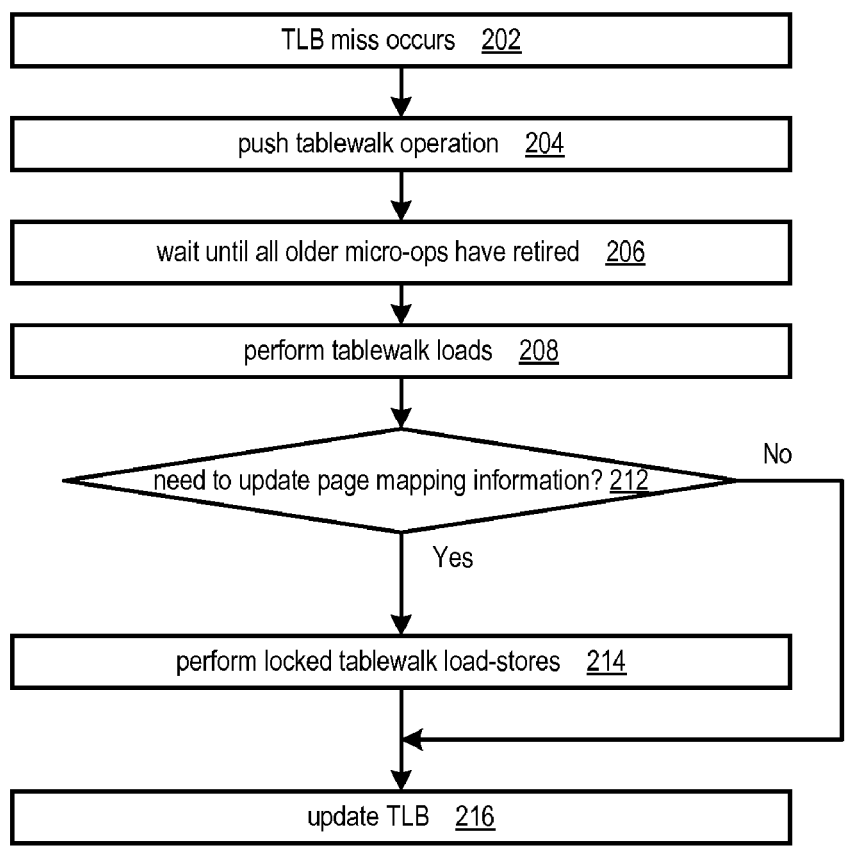
FIG. 2 is a flowchart illustrating operation of a conventional microprocessor to perform a tablewalk.

Referring now to FIG. 2, a flowchart illustrating operation of a conventional microprocessor to perform a tablewalk is shown. The flowchart of FIG. 2 is provided to illustrate the differences between the operation of a conventional microprocessor and the microprocessor 100 that performs speculative tablewalks according to the present invention. Flow begins at block 202.

At block 202, the conventional microprocessor detects that a TLB miss of a virtual page address of load/store instruction, referred to as the tablewalk initiator instruction, or simply initiator instruction. Flow proceeds to block 204.

At block 204, the conventional microprocessor pushes a tablewalk operation. That is, the conventional microprocessor updates state within the microprocessor to indicate that it needs to perform a tablewalk with respect to the memory page accessed by the initiator instruction. Flow proceeds to block 206.

At block 206, the conventional microprocessor waits to perform the tablewalk until all microinstructions within the microprocessor that are older than the initiator instruction have retired. Thus, the conventional microprocessor serializes the tablewalk with respect to other instructions outstanding in the conventional microprocessor. Flow proceeds to block 208.

At block 208, now that all microinstructions older than the initiator instruction have retired, the conventional microprocessor performs load operations associated with the tablewalk. That is, the conventional microprocessor reads page mapping information from system memory to obtain the virtual to physical page address translation and characteristics of the memory page implicated by the load/store instruction. Flow proceeds to decision block 212.

At decision block 212, the conventional microprocessor determines whether it needs to update the page mapping information. If not, flow proceeds to block 216; otherwise, flow proceeds to block 214.

At block 214, the conventional microprocessor performs locked load-store operations associated with the tablewalk. That is, the conventional microprocessor reads the page mapping information, updates the page mapping information as appropriate, and writes the modified page mapping information back to system memory, all in a locked fashion on the processor bus to guarantee that the read/modify/write of the page mapping information is atomic. Flow proceeds to block 216.

At block 216, the conventional microprocessor allocates an entry in the TLB and updates the TLB with the physical address and characteristic of the memory page to complete the tablewalk operation. Flow ends at block 216.

As may be observed from FIG. 2, the conventional microprocessor disadvantageously serializes performance of the tablewalk operation with the other instructions outstanding in the microprocessor, which may result in a lower instruction execution rate than a microprocessor operating according to the present invention.

Referring now to FIG. 3, a flowchart illustrating operation of the microprocessor 100 of FIG. 1 to perform a tablewalk according to the present invention is shown. Flow begins at block 302.

At block 302, the microprocessor 100 detects that the virtual page address of a load/store instruction (the initiator instruction) executing in the load unit 132 or store unit 134 missed in the TLB 128 of FIG. 1. Flow proceeds to block 304.

At block 304, the tablewalk engine 142 pushes a tablewalk operation. That is, the tablewalk engine 142 updates state within the microprocessor 100 to indicate that it needs to perform a tablewalk with respect to the memory page accessed by the initiator instruction. Flow proceeds to block 308.

At decision block 308, the tablewalk engine 142 determines whether a current tablewalk load operation is strongly-ordered. A tablewalk load operation is a load of page mapping information, such as a page directory entry or page table entry, from memory into the microprocessor 100 that enables the tablewalk engine 142 to perform the tablewalk. In one embodiment, a tablewalk load is strongly-ordered if the page being accessed has a characteristic of being uncacheable. In one embodiment, the tablewalk engine 142 determines whether a page has a characteristic of being uncacheable if its page-level cache disable (PCD) bit in the page mapping information is set, as described on page 3-28 of the IA-32 Intel Architecture Software Developer's Manual referenced above. In particular, the microprocessor 100 performs the check at block 308 to avoid requesting the BIU 116 to perform a transaction on the processor bus associated with a tablewalk that is in an incorrect order because a page is specified as uncacheable. Advantageously, there may be many tablewalks in which the tablewalk loads are not strongly-ordered, in which case the microprocessor 100 may potentially perform tablewalks faster than the conventional microprocessor by performing the tablewalk speculatively. If the tablewalk load is not strongly-ordered, flow proceeds to block 314; otherwise, flow proceeds to block 312.

At block 312, the tablewalk engine 142 waits until all microinstructions older than the initiator instruction have retired, i.e., the tablewalk engine 142 serializes the tablewalk load. The tablewalk engine 142 serializes the tablewalk load because it has determined at decision block 308 that a tablewalk load is strongly-ordered. In one embodiment, the microprocessor 100 also waits until all stores older than the initiator instruction have committed their store data to memory before proceeding. Flow proceeds to block 314.

At block 314, the tablewalk engine 142 performs the current tablewalk load operation. Flow proceeds to decision block 316.

At decision block 316, the tablewalk engine 142 determines whether it needs to perform more tablewalk loads. If so, flow returns to decision block 308; otherwise, flow proceeds to decision block 318.

At decision block 318, the tablewalk engine 142 determines whether it needs to update the page mapping information in system memory. In one embodiment, the tablewalk engine 142 determines whether it needs to update the page mapping information by determining whether it needs to set the Accessed or Dirty bits in the page mapping information as described on pages 3-28 and 3-29 of the IA-32 Intel Architecture Software Developer's Manual referenced above. The tablewalk engine 142 performs the check at decision block 318 to avoid updating system memory speculatively because the microprocessor 100 is not allowed to update architectural state speculatively. Advantageously, there may be many tablewalks that do not require the tablewalk engine 142 to update the page mapping information, in which case the microprocessor 100 may potentially perform tablewalks faster than the conventional microprocessor by performing the tablewalk speculatively. If the tablewalk engine 142 does not need to update the page mapping information, flow proceeds to decision block 326; otherwise, flow proceeds to block 322.

At block 322, the tablewalk engine 142 waits until all microinstructions older than the initiator instruction have retired, i.e., the tablewalk engine 142 serializes the updating the page mapping portion of the tablewalk. The tablewalk engine 142 serializes the page mapping portion of the tablewalk because it has determined at decision block 318 that it needs to update the page mapping information in system memory. In one embodiment, the microprocessor 100 also waits until all stores older than the initiator instruction have committed their store data to memory before proceeding. Flow proceeds to block 324.

At block 324, the tablewalk engine 142 performs locked load-store operations associated with the tablewalk. That is, the microprocessor 100 reads the page mapping information, updates the page mapping information (such as the Accessed and/or Dirty bits) as appropriate, and writes the updated page mapping information back to system memory, all in a locked fashion on the processor bus to guarantee that the read/modify/write of the page mapping information is atomic. Flow proceeds to decision block 326.

At decision block 326, the tablewalk engine 142 determines whether the system memory page for which the tablewalk will update the TLB 128 (i.e., the page whose virtual page address missed in the TLB 128 at block 302) is a global page. In one embodiment, a page is global if the microprocessor 100 does not flush its TLB 128 entry in response to typical TLB-synchronizing events, such as a task switch. The operating system commonly assigns the global characteristic to pages containing its own code. If the page is global, the tablewalk engine 142 must update the TLB 128 entry non-speculatively because if it is determined that the tablewalk should not have been performed (e.g., due to an exception or mispredicted branch instruction), then the tablewalk engine 142 might be updating the TLB 128 entry with incorrect data, and the incorrect data would not get flushed in response to typical TLB-synchronizing events because it is a global page. In one embodiment, a page is a global page if its Global (G) bit is set in the page mapping information as described on pages 3-29 and 3-30 of the IA-32 Intel Architecture Software Developer's Manual referenced above. Advantageously, there may be many situations in which the system memory page for which the tablewalk will update the TLB 128 is not a global page, in which case the microprocessor 100 may potentially perform tablewalks faster than the conventional microprocessor by performing the tablewalk speculatively. If the page for which the tablewalk will update the TLB 128 is not a global page, flow proceeds to block 332; otherwise, flow proceeds to block 328.

At block 328, the tablewalk engine 142 waits until all microinstructions older than the initiator instruction have retired, i.e., the tablewalk engine 142 serializes the TLB 128 update portion of the tablewalk. The tablewalk engine 142 serializes the tablewalk because it has determined at decision block 326 that the page for which the tablewalk will update the TLB 128 is a global page. In one embodiment, the microprocessor 100 also waits until all stores older than the initiator instruction have committed their store data to memory before proceeding. Flow proceeds to block 332.

At block 332, the tablewalk engine 142 allocates an entry in the TLB 128 and populates the entry with the physical page address and characteristics of the page that was accessed by the load/store instruction whose virtual address missed in the TLB 128 at block 302. Flow ends at block 332.

As may be observed from FIG. 3, once none of the tablewalk loads are strongly ordered, no page mapping information entries need updating, and the page whose virtual address missed in the TLB 128 is not a global page, then the microprocessor 100 performs the tablewalk speculatively without serializing it with the other program instructions. The present inventors have observed that none of these serializing conditions are present for a significant percentage of the occasions a tablewalk is required. Thus, the speculative tablewalk embodiments described herein potentially enable the microprocessor 100 to execute programs faster since the microprocessor 100 may execute the initiator instruction and instructions that depend upon it sooner than a conventional microprocessor would perform the tablewalk.

It is noted that the architectural requirements of specific microprocessor architectures may impose other limitations upon the ability of the microprocessor 100 to perform speculative page table walks. For example, in one embodiment the microprocessor 100 is an x86 architecture microprocessor. A microprocessor is an x86 architecture processor if it can correctly execute a majority of the application programs that are designed to be executed on an x86 microprocessor. An application program is correctly executed if its expected results are obtained. In x86 architecture parlance, virtual addresses are referred to as linear addresses.

According to one embodiment, the microprocessor 100 also waits to perform the tablewalk until each store microinstructions within the microprocessor 100 that is older than the initiator instruction has its physical memory address resolved. In this embodiment, the microprocessor 100 detects collisions between a tablewalk load and an older store operation, and then forwards the relevant store data from the colliding older store to the tablewalk load. Therefore, the tablewalk engine 142 must prevent the microprocessor 100 from forwarding incorrect data to a tablewalk load operation since if the older store microinstruction is still being speculatively executed it might end up being flushed. This additional check is necessary in an embodiment in which the microprocessor 100 does not allocate architectural state to the tablewalk load operations in the ROB 108 and load buffer 136 such that the tablewalk load operations do not enjoy the full benefit of the speculative execution and recovery mechanism of the microprocessor 100 enjoyed by program-related instructions. In one embodiment, the tablewalk engine 142 assigns the ROB 108 tag of the initiator instruction to each of the tablewalk load operations, which enables the microprocessor 100 to determine the age of tablewalk operations relative to other outstanding instructions within the microprocessor 100. Some implementations of x86 architecture processors impose upon system software the requirement of executing TLB-synchronizing instructions when updating page mapping information in system memory that may cause there to be no older store instructions that collide with the tablewalk loads; therefore, the microprocessor 100 will not be forwarding data from stores to tablewalk loads anyway. An example of such an implementation is described in the Application Note entitled "TLBs, Paging-Structure Caches, and Their Invalidation", revision 002, document number 317080-002, published by Intel Corporation, April 2008, which is hereby incorporated by reference herein for all purposes.

According to another embodiment, the microprocessor 100 also waits to perform the tablewalk until there are no unretired store operations older than the initiator instruction. This embodiment potentially provides lower performance but requires less complexity and power consumption than the embodiment that merely waits until there are no unretired store operations older than the initiator instruction with unknown memory addresses.

Although embodiments have been described with respect to the page mapping scheme found in x86 architecture microprocessors, the invention is not limited to that particular page mapping scheme, but may instead be used in microprocessors with other page mapping schemes.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the present invention may include methods of providing a microprocessor described herein by providing software describing the design of the microprocessor and subsequently transmitting the software as a computer data signal over a communication network including the Internet and intranets. It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the herein-described exemplary embodiments, but should be defined only in accordance with the following claims and their equivalents. The present invention is implemented within a microprocessor device which may be used in a general purpose computer.

Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A microprocessor configured to perform a speculative tablewalk, comprising:
   a translation lookaside buffer (TLB), configured to indicate that a physical page address of a page of memory that a memory access instruction is attempting to access is missing in the TLB; and
   a tablewalk engine, configured to:
   determine whether at least one of a predetermined set of conditions exists with respect to characteristics of the page of memory;

perform operations of the tablewalk in an out-of-order manner with respect to the execution of unretired program instructions older than the memory access instruction, while none of the predetermined set of conditions exists; and wait to perform the operations of the tablewalk until the microprocessor has retired all program instructions older than the memory access instruction, when at least one of the predetermined set of conditions exists;

wherein to determine whether at least one of the predetermined set of conditions exists, the tablewalk engine is configured to at least determine whether the memory page whose physical page address is missing in the TLB is a global page;

wherein to determine whether the memory page whose physical page address is missing in the TLB is a global page, the tablewalk engine is configured to at least determine whether the memory page whose physical page address is missing in the TLB is of a type for which the microprocessor will not invalidate an entry in the TLB for the memory page when the microprocessor performs a task switch.

2. The microprocessor as recited in claim 1, wherein to perform the operations of the tablewalk, the tablewalk engine is configured to at least read from the memory the physical page address of the memory page whose physical page address is missing in the TLB.

3. The microprocessor as recited in claim 2, wherein to perform the operations of the tablewalk, the tablewalk engine is configured to additionally write the physical page address into an entry of the TLB after it reads from the memory the physical page address.

4. The microprocessor as recited in claim 2, wherein to perform the operations of the tablewalk, the tablewalk engine is configured to additionally selectively update in the memory paging information associated with the memory page whose physical page address is missing in the TLB after it reads from the memory the physical page address.

5. The microprocessor as recited in claim 1, wherein to determine whether at least one of the predetermined set of conditions exists, the tablewalk engine is configured to at least determine whether the tablewalk involves accessing a page of memory to which accesses must be strongly ordered with respect to other memory access transactions on a memory bus of the microprocessor.

6. The microprocessor as recited in claim 5, wherein accesses to the page of memory must be strongly ordered with respect to other memory access transactions on a memory bus of the microprocessor if the page of memory is an uncacheable memory page.

7. The microprocessor as recited in claim 1, wherein to determine whether at least one of the predetermined set of conditions exists, the tablewalk engine is configured to at least determine whether the tablewalk involves updating paging information in memory.

8. The microprocessor as recited in claim 7, wherein to determine whether the tablewalk involves updating paging information in memory, the tablewalk engine is configured to determine whether the tablewalk involves updating the paging information to indicate that the page of memory whose physical page address is missing in the TLB has been written.

9. The microprocessor as recited in claim 7, wherein to determine whether the tablewalk involves updating paging information in memory, the tablewalk engine is configured to determine whether the tablewalk involves updating the paging information to indicate that the page of memory whose physical page address is missing in the TLB has been accessed.

10. The microprocessor as recited in claim 1, wherein the tablewalk engine is further configured to wait to perform the operations of the tablewalk until the microprocessor has determined the physical memory address specified by all program store instructions that are older than the memory access instruction.

11. The microprocessor as recited in claim 1, wherein the tablewalk engine is further configured to wait to perform the operations of the tablewalk until the microprocessor has retired all program store instructions that are older than the memory access instruction and that have an unknown memory address at the time the tablewalk is ready to access memory.

12. A method for a microprocessor having a translation lookaside buffer (TLB) to speculatively perform a tablewalk in response to the microprocessor executing a memory access instruction that accesses a page of memory whose physical page address is missing in the TLB, the method comprising:

determining whether at least one of a predetermined set of conditions exists with respect to characteristics of the page of memory;

performing operations of the tablewalk in an out-of-order manner with respect to the execution of unretired program instructions older than the memory access instruction, while none of the predetermined set of conditions exists; and waiting to perform the operations of the tablewalk until the microprocessor has retired all program instructions older than the memory access instruction, when at least one of the predetermined set of conditions exists;

wherein said determining whether at least one of a predetermined set of conditions exists comprises:

determining whether the memory page whose physical page address is missing in the TLB is a global page;

wherein said determining whether the memory page whose physical page address is missing in the TLB is a global page comprises:

determining whether the memory page whose physical page address is missing in the TLB is of a type for which the microprocessor will not invalidate an entry in the TLB for the memory page when the microprocessor performs a task switch.

13. The method as recited in claim 12, wherein said performing operations of the tablewalk comprises:

reading from the memory the physical page address of the memory page whose physical page address is missing in the TLB.

14. The method as recited in claim 13, wherein said performing operations of the tablewalk comprises:

writing the physical page address into an entry of the TLB, after said reading from the memory the physical page address.

15. The method as recited in claim 13, wherein said performing operations of the tablewalk comprises:

selectively updating in the memory paging information associated with the memory page whose physical page address is missing in the TLB, after said reading from the memory the physical page address.

16. The method as recited in claim 12, wherein said determining whether at least one of a predetermined set of conditions exists comprises:

determining whether the tablewalk involves accessing a page of memory to which accesses must be strongly ordered with respect to other memory access transactions on a memory bus of the microprocessor.

17. The method as recited in claim 16, wherein accesses to the page of memory must be strongly ordered with respect to other memory access transactions on a memory bus of the microprocessor if the page of memory is an uncacheable memory page.

18. The method as recited in claim 12, wherein said determining whether at least one of a predetermined set of conditions exists comprises:
   determining whether the tablewalk involves updating paging information in memory.

19. The method as recited in claim 18, wherein said determining whether the tablewalk involves updating paging information in memory comprises:
   determining whether the tablewalk involves updating the paging information to indicate that the page of memory whose physical page address is missing in the TLB has been written.

20. The method as recited in claim 18, wherein said determining whether the tablewalk involves updating paging information in memory comprises:
   determining whether the tablewalk involves updating the paging information to indicate that the page of memory whose physical page address is missing in the TLB has been accessed.

21. The method as recited in claim 12, further comprising:
   waiting to perform the operations of the tablewalk until the microprocessor has determined the physical memory address specified by all program store instructions that are older than the memory access instruction.

22. The method as recited in claim 12, further comprising:
   waiting to perform the operations of the tablewalk until the microprocessor has retired all program store instructions that are older than the memory access instruction and that have an unknown memory address at the time the tablewalk is ready to access memory.

23. A computer program product for use with a computing device, the computer program product comprising:
   a computer usable storage medium, having computer readable program code embodied in said medium, for specifying a microprocessor configured to perform a speculative tablewalk, the computer readable program code comprising:
      first program code for specifying a translation lookaside buffer (TLB), configured to indicate that a physical page address of a page of memory that a memory access instruction is attempting to access is missing in the TLB; and
      second program code for specifying a tablewalk engine, configured to:
         determine whether at least one of a predetermined set of conditions exists with respect to characteristics of the page of memory;
         perform operations of the tablewalk in an out-of-order manner with respect to the execution of unretired program instructions older than the memory access instruction, while none of the predetermined set of conditions exists; and
         wait to perform the operations of the tablewalk until the microprocessor has retired all program instructions older than the memory access instruction, when at least one of the predetermined set of conditions exists;
   wherein to determine whether at least one of the predetermined set of conditions exists, the tablewalk engine is configured to at least determine whether the memory page whose physical page address is missing in the TLB is a global page;
   wherein to determine whether the memory page whose physical page address is missing in the TLB is a global page, the tablewalk engine is configured to at least determine whether the memory page whose physical page address is missing in the TLB is of a type for which the microprocessor will not invalidate an entry in the TLB for the memory page when the microprocessor performs a task switch.

* * * * *